United States Patent
Frederiksen et al.

(10) Patent No.: US 8,559,457 B2
(45) Date of Patent: Oct. 15, 2013

(54) METHOD FOR DYNAMIC INTERPRETATION OF TRANSPORT BLOCK SIZE

(75) Inventors: Frank Frederiksen, Klarup (DK); Esa Malkamäki, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1170 days.

(21) Appl. No.: 12/141,014

(22) Filed: Jun. 17, 2008

(65) Prior Publication Data

US 2008/0313521 A1    Dec. 18, 2008

Related U.S. Application Data

(60) Provisional application No. 60/944,770, filed on Jun. 18, 2007.

(51) Int. Cl.
*H04J 11/00* (2006.01)
*H04J 3/12* (2006.01)

(52) U.S. Cl.
USPC .......................... 370/465; 370/522

(58) Field of Classification Search
None
See application file for complete search history.

(56) References Cited

U.S. PATENT DOCUMENTS

| | | | |
|---|---|---|---|
| 8,218,491 B2 * | 7/2012 | Lee et al. | 370/329 |
| 2003/0123470 A1 | 7/2003 | Kim et al. | 370/437 |
| 2005/0063345 A1 * | 3/2005 | Wu et al. | 370/335 |
| 2005/0174985 A1 * | 8/2005 | Lee et al. | 370/349 |
| 2007/0133579 A1 * | 6/2007 | Kim | 370/403 |
| 2008/0002618 A1 * | 1/2008 | Murata et al. | 370/329 |
| 2008/0056229 A1 * | 3/2008 | Gholmieh et al. | 370/349 |
| 2009/0041110 A1 * | 2/2009 | Malladi | 375/240 |
| 2009/0168683 A1 * | 7/2009 | Franceschini et al. | 370/312 |
| 2009/0327828 A1 * | 12/2009 | Ojala et al. | 714/749 |

FOREIGN PATENT DOCUMENTS

| | | |
|---|---|---|
| EP | 1 414 202 A1 | 4/2004 |
| EP | 1 628 430 A2 | 2/2006 |
| JP | 2006086550 A | 3/2006 |

OTHER PUBLICATIONS

3GPP TSG-RAN Working Group 1 #4, "Way Forward on LTE Rate Matching", Nokia Siemens Networks, Nokia, Kobe, Japan, May 7-11, 2007, Tdoc R1-072273, 4 pages.
ETSI TS 125 321, V6.10.0 (Sep. 2006), Universal Mobile Telecommunications System (UMTS); Medium Access Control (MAC) Protocol Specification (3GPP TS 25.321 version 6.10.0 Release 6), 93 pages.
3GPP TR 25.814 V7.1.0 (Sep. 2006), $3^{rd}$ Generation Partnership Project; Technical Specification Group Radio Access Network; Physical Layer Aspects for Evolved Universal Terrestrial Radio Access (UTRA) (Release 7), 132 pages.
Samsung et al., 3GPP TSG RAN WG 1 Meeting #49, R1-072245, "Circular buffer rate matching for LTE", Kobe, May 2007, 3 pages.

* cited by examiner

*Primary Examiner* — Eunsook Choi
(74) *Attorney, Agent, or Firm* — Harrington & Smith

(57) ABSTRACT

A system and method is provided which allows for the dynamic interpretation of a transport block size field in a Layer 1/Layer 2 (L1/L2) control channel, such that for any first H-ARQ transmission, the transport block size indication field will indicate the size of the transport block. For any retransmission, the transport block size indication bits can be transformed into dedicated bits for indicating the RV used as it relates to circular buffering. A robust bit field for indicating new data transmission (e,g, new data indication (NDI)) is therefore introduced, and from a UE perspective it is possible to determine how to interpret the transport block size field.

70 Claims, 5 Drawing Sheets

METHOD FOR DYNAMIC INTERPRETATION OF TRANSPORT BLOCK SIZE

CROSS-REFERENCE TO RELATED APPLICATIONS

The present application claims priority to U.S. Provisional Patent Application No. 60/944,770, filed Jun. 18, 2007, incorporated herein by reference.

FIELD OF THE INVENTION

The present invention relates generally to radio communications. More particularly, the present invention relates to efficient signaling through the definition of downlink control channels in accordance with Third Generation Partnership Project (3GPP) Long Term Evolution (LTE) standardization.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Universal Mobile Telecommunications System (UMTS) is a third generation (3G) mobile communication system which provides a variety of multimedia services. The UMTS Terrestrial Radio Access Network (UTRAN) is a part of a UMTS network which includes one or more radio network controllers (RNCs) and one or more nodes. The 3GPP is a collaboration of several independent standardization organizations that is focused on the development of globally applicable 3G mobile phone system specifications. The Technical Specification Group Radio Access Network (TSG RAN) is responsible for the definition of the functions, requirements and interfaces of the universal terrestrial radio access (UTRA) network in its two modes, frequency division duplex (FDD) and time division duplex (TDD). Evolved UTRAN (E-UTRAN), which is also known as Long Term Evolution or LTE, provides new physical layer concepts and protocol architectures for UMTS.

LTE is currently part of a work item phase within the 3GPP. One of the central elements of the system is a downlink control channel, which will carry all of the control information needed to assign resources for the downlink as well as the uplink data channels, where downlink and uplink conventionally refer to transmission paths to and from a mobile station and, for example, a base transceiver station. The elements for the control channel carrying allocation for the downlink channel, following the 3GPP 25.814 specification, can comprise at least: a resource allocation map describing the allocation map for physical resource blocks (PRBs); a modulation scheme/technique; a transport block size or payload size; Hybrid Automatic Repeat-reQuest (H-ARQ) information; multiple-input multiple-output (MIMO) information; and/or a duration of assignment.

3GPP Release 5 (Rel-5) introduced a new high speed downlink shared channel (HS-DSCH). In HS-DSCH transmission utilizing a H-ARQ system (a N-process stop-and-wait system), due to fact that different H-ARQ processes may require a different number of retransmissions, the medium access layer (MAC-hs) packet data units (PDUs) are not necessarily received in order by a desiring MAC-hs receiver. For example, two packets, packet 1 and packet 2, can be sent in consecutive transmission time intervals (TTIs). In this situation, it is possible that when packet 2 is received correctly by layer 1, the packet 1 may need further transmissions before it is correctly received and delivered to the MAC-hs layer of a user equipment (UE) receiver, thus leading to packet 2 getting to the MAC-hs before packet 1 during in-sequence delivery.

A physical downlink shared channel (PDSCH) can be used to carry the DSCH. In terms of considering PDSCH resource allocations, decisions in the 3GPP have gravitated towards using a circular buffer to implement rate matching between a turbo coded transport block and the amount of available physical resources. An issue related to the circular buffer technique has been described in a 3GPP contribution, R1-072273, entitled "Way Forward on LTE Rate Matching." In this contribution, it was identified that in order to have good performance using the circular buffer technique, certain restrictions would be necessary, e.g., high redundancy version (RV) signaling granularity or limitations on the variability of the amounts of physical channel resources given to a single user for H-ARQ retransmissions. Therefore, both approaches can create additional problems in the form of either increased overhead or limited flexibility.

FIG. 1 illustrates an example of the circular buffer technique combined with H-ARQ using constant size resource allocation for H-ARQ retransmissions. According to FIG. 1, a transport block 100 is channel coded at 102 (omitting certain details such as cyclical redundancy check (CRC), tail bits, etc.). This provides, for example, three times the amount of bits, e.g., systematic bits 104, parity 1 bits 106, and parity 2 bits 108. The systematic bits 104 are interleaved at 110, resulting in interleaved systematic bits 114, while the parity 1 and parity 2 bits are parity bit interleaved at 112 resulting in interleaved parity 1 and parity 2 bits 116. According to the conventional circular buffer technique, the most important bits are taken for a first transmission 118, e.g., the systematic bits 114 and a first portion of the interleaved parity 1 and parity 2 bits 116. If reception of this first transmission 118 fails, a second transmission 120 is requested. For optimum operation of the conventional circular buffer technique, the second transmission 120 should take the coded bits that have not yet been transmitted, e.g., another portion of the interleaved parity 1 and parity 2 bits. Lastly, for a third transmission 122, the remaining non-transmitted bits are sent, and if excess capacity exists on the physical channel, additional systematic bits from the interleaved systematic bits 114 are transmitted (hence the circular buffer terminology). Therefore, as retransmissions are performed, the effective puncturing (omission of, for example, bits) is gradually reduced, such that after a given number of retransmissions, all the systematic and parity bits have been transferred for optimum decoder performance.

The example of transmission with circular buffering shown in FIG. 1 only illustrates a situation where the amount of physical resources is the same for each transmission attempt. With the need for frequency domain multi-user packet scheduling in LTE, a scenario will likely arise where H-ARQ retransmissions may not have access to the same amount of physical resources. Such a scenario is illustrated in FIG. 2, where the amount of physical resources for the second transmission is reduced, thus providing fewer parity bits for this particular H-ARQ retransmission.

Like FIG. 1, FIG. 2 shows a transport block 100 that is channel coded at 102 into systematic bits 104, parity 1 bits 106, and parity 2 bits 108. Interleaving of these bits occurs at 110 and 112, resulting in interleaved systematic bits 114 and interleaved parity 1 and parity 2 bits 116. The most important bits are taken for transmission at 118.

However, a problem arises when a second transmission 120 is lost in the receiver and the third transmission 122 is to take place. One possibility is to continue transmissions assuming that the physical resources are the same for each retransmission. This will cause "holes" in the received bit sequence, though, as shown in FIG. 2, where the third transmission 122 fails to transmit a certain portion(s) of the interleaved parity 1 and parity 2 bits. This effectively negates the "circular" property of circular buffering and penalizes H-ARQ performance (as compared to the conventional and idealized circular buffering scenario illustrated in FIG. 1). Alternatively, sufficient information could be provided at the starting point of the retransmitted data as shown by third transmission 124. However, this would require a high number of control channel bits for indicating this value.

Thus, in the presence of unequal resource allocation for retransmissions or an asynchronous H-ARQ protocol, a "signaled resource block (RB)" approach is required (either explicit or implicit), as is the case for 3GPP Rel-5 rate matching. While redundancy versions can be defined for circular buffer rate matching, it should be noted that doing so incurs the cost of losing the "circular" property of circular buffering, making circular buffering and Rel-5 (or Rel-5+Dithering) proposals equivalent from an H-ARQ perspective. That is, the circular buffer technique has not been utilized in previous 3GPP releases, and conventional signaling methods have only been designed for 3GPP Release '99 rate matching with RVs, level indicators, etc.

SUMMARY OF THE INVENTION

Various embodiments of the present invention allow for the dynamic interpretation of the transport block size field in the Layer 1/Layer 2 (L1/L2) control channel, such that for any first H-ARQ transmission, the transport block size indication field will indicate the size of the transport block. For any retransmission, the transport block size indication bits can be transformed into dedicated bits for indicating the RV used as it relates to circular buffering. A robust bit field for indicating new data transmission (e,g, new data indication (NDI)) is therefore introduced and from a UE perspective, it is possible to determine how to interpret the transport block size field.

In addition, various embodiments of the present invention use a signaling method for the NDI that is different than the signalling method conventionally utilized for transmitting L1/L2 control channel data. As a result, the L1/L2 control channel size can be reduced such that the performance of the L1/L2 control channel is improved. Furthermore, H-ARQ performance can be improved, while the "holes" or omissions described above that result from applying the conventional circular buffer rate matching approach can be avoided.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
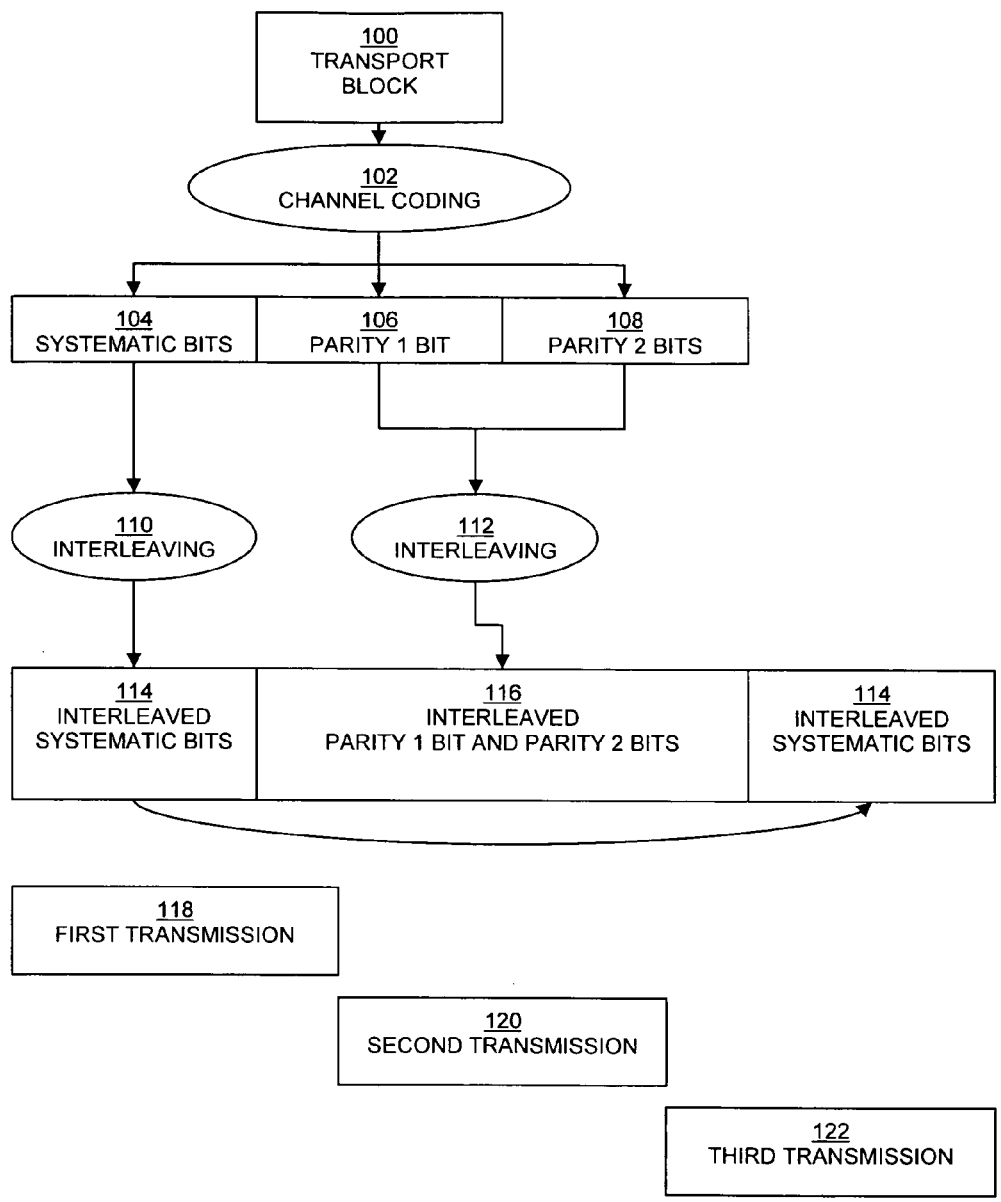
FIG. 1 illustrates a conventional circular buffer method utilized with H-ARQ using constant size resource allocation for H-ARQ retransmissions.

Various embodiments of the present invention allow for the dynamic interpretation of the transport block size field in the Layer 1/Layer 2 (L1/L2) control channel, such that for any first H-ARQ transmission (e.g., all initial transmissions), the transport block size indication field will indicate the size of the transport block (e.g., the user data payload). It should be noted that the L1/L2 control channel can be, for example, a downlink shared control channel or a physical downlink control channel (PDCCH). For any retransmission, the transport block size indication bits can be transformed into dedicated bits for indicating the RV used—in terms of the circular buffer technique. It should be noted that the term "RV" can refer to an offset. In order to achieve this dynamic interpretation, a robust bit field for indicating new data transmission (e,g, new data indication (NDI)) is introduced. Therefore, from a UE perspective it is possible to determine how to interpret the transport block size field.

As noted above, interpretation of the transport block size field depends on the NDI. That is, the various embodiments of the present invention define a signaling method for a UE via a control channel table, where the same transport block size field can be used to indicate both the transport block size in a first H-ARQ transmission and the RV (e.g., the starting point of the Nth transmission in circular buffer rate matching) in subsequent retransmissions. Table 1 below is an example of such a control channel table. It should be noted, however, that other variations/iterations of a control channel table can be defined in accordance with the various embodiments of the present invention.

TABLE 1

| Bit field name | Number of bits | Comment |
| --- | --- | --- |
| PRB allocation map | 26 | Allocation of physical resources for a given UE. |
| Modulation scheme | 2 | Indicating Quadrature Phase-Shift Keying (QPSK), 16-Quadrature Amplitude Modulation (QAM), or 64-QAM. |
| MIMO precoding information | 3 | Codebook-based MIMO. |
| H-ARQ process ID | 3 | N-channel stop-and-wait assumed. |
| New data indication | 1 | "1" = New data, "0" = H-ARQ retransmission. |
| Transport block size | 4-5 | Used for indicating the effective coding technique/transport block size when transmitting new data. When doing a H-ARQ retransmission, this will indicate the |

TABLE 1-continued

| Bit field name | Number of bits | Comment |
| --- | --- | --- |
| | | RV/circular buffer offset for the retransmission. It is assumed that the first transmission will use a predefined offset. |
| Additional information | 1-3 | Localized or distributed transmission. |
| UEID + CRC | 16-20 | Used for making sure that the correct UE is addressed with the control channel. |

It should be noted that the various embodiments of the present invention are implemented in accordance/associated with signal transmission rate matching between a transmitter and a receiver, e.g., mobile device UEs or a UE and a UMTS-equivalent base transceiver station (Node B). As described above, an exemplary communication system can utilize turbo coding of signals where a message to be transmitted by a transmitter is encoded so that the ratio of input bits representative of the message to output bits representative of the coded signal is, for example, ⅓. That is, the output signal has three times the number of bits as compared to the input, where each input bit is output as a corresponding systematic bit and after further encoding/interleaving, the input bits are also used to generate first and second parity bits. Communication systems, e.g., UMTS, can operate using a plurality of different coding rates, hence the utilization of rate matching where a transmitter can covert the original coding rate of an output from its encoder into another coding rate by either repetition or puncturing. Repetition occurs when, for example, the original coding rate is higher than the coding rate to which it is to be converted, while puncturing occurs when, for example, the original coding rate is lower than the coding rate to which it is to be converted.

As also described above, downlink and uplink data channels refer to transmission paths between, for example, a mobile device UE and a UMTS Node B. Additionally, the UMTS base transceiver station can be embodied by an evolved Node B (eNode B). In accordance with the various embodiments of the present invention, the Node B/eNode B will know that a UE has decoded the L1/L2 control channel correctly by receiving a negative acknowledgement (NACK). That is, the UE can act as a receiver that receives a signal, e.g., data packet, representative of the rate matched output described above, whereas signals which have not been decoded correctly are stored for future decoding in accordance with H-ARQ. It can be assumed that the UE knows or can determine the user information payload size (i.e., the transport block size) for any retransmission as long as the NDI is utilized and provided that the L1/L2 control channel information for the first H-ARQ transmission was decoded correctly. In other words, it is not necessary to implement another separate bit field for indicating H-ARQ retransmission information. Additionally, in light of the above assumption, transmitting such H-ARQ retransmissions information would result in wasted capacity.

It should be noted that various embodiments of the present invention can be implemented by utilizing a filed other than a new data indication/indicator field. For example, a retransmission sequence number (RSN) can be utilized to indicate a new data transmission/first transmission. Moreover, a field other than the transport block size field can be utilized to carry the transport block size, RV, etc. That is any field that goes unchanged for retransmissions can be utilized, as can some newly defined field that also does not change for retransmission purposes.

It should be noted that the various embodiments of the present invention use a signaling method for the NDI that is different than the signalling method conventionally utilized for transmitting L1/L2 control channel data. Conventional signaling methods utilize a state change, where the same level is utilized for all transmissions within a single H-ARQ process and the level is changed when a new transmission is initiated. In addition, the complexity associated with decoding the L1/L2 control channel is increased slightly. However, such issues are outweighed by the advantages provided by the various embodiments of the present invention, e.g., a reduction in L1/L2 control channel size, such that the performance of the L1/L2 control channel will be improved. Furthermore, besides better L1/L2 control channel performance, H-ARQ performance can be improved as well, and the "holes" or omissions described above that are present when applying the conventional circular buffer rate matching approach can be avoided.

Various embodiments of the present invention discussed herein have been described in relation to downlink data transmission. However, various embodiments can be effectuated which utilize uplink data transmission as well. For example, in LTE, uplink data parameters can be sent in the downlink PDCCH and interpreted by a UE, but can also be used for transmitting data in the uplink. That is, for downlink data, as in High-Speed Downlink Packet Access (HSDPA), both control information and data are sent in the downlink direction and received by the UE. For uplink data, control information and data are sent from the UE to an eNode B, for example.

Figure 3:
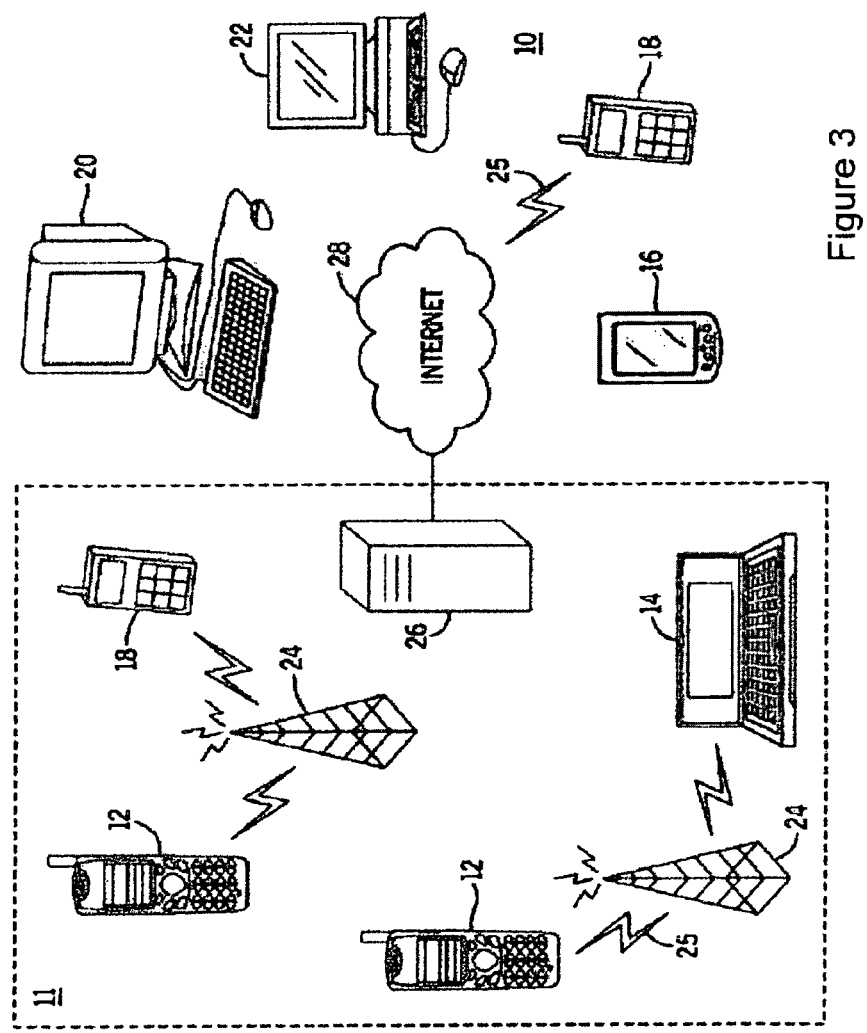
FIG. 3 is an overview diagram of a system within which the present invention may be implemented.

FIG. 3 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
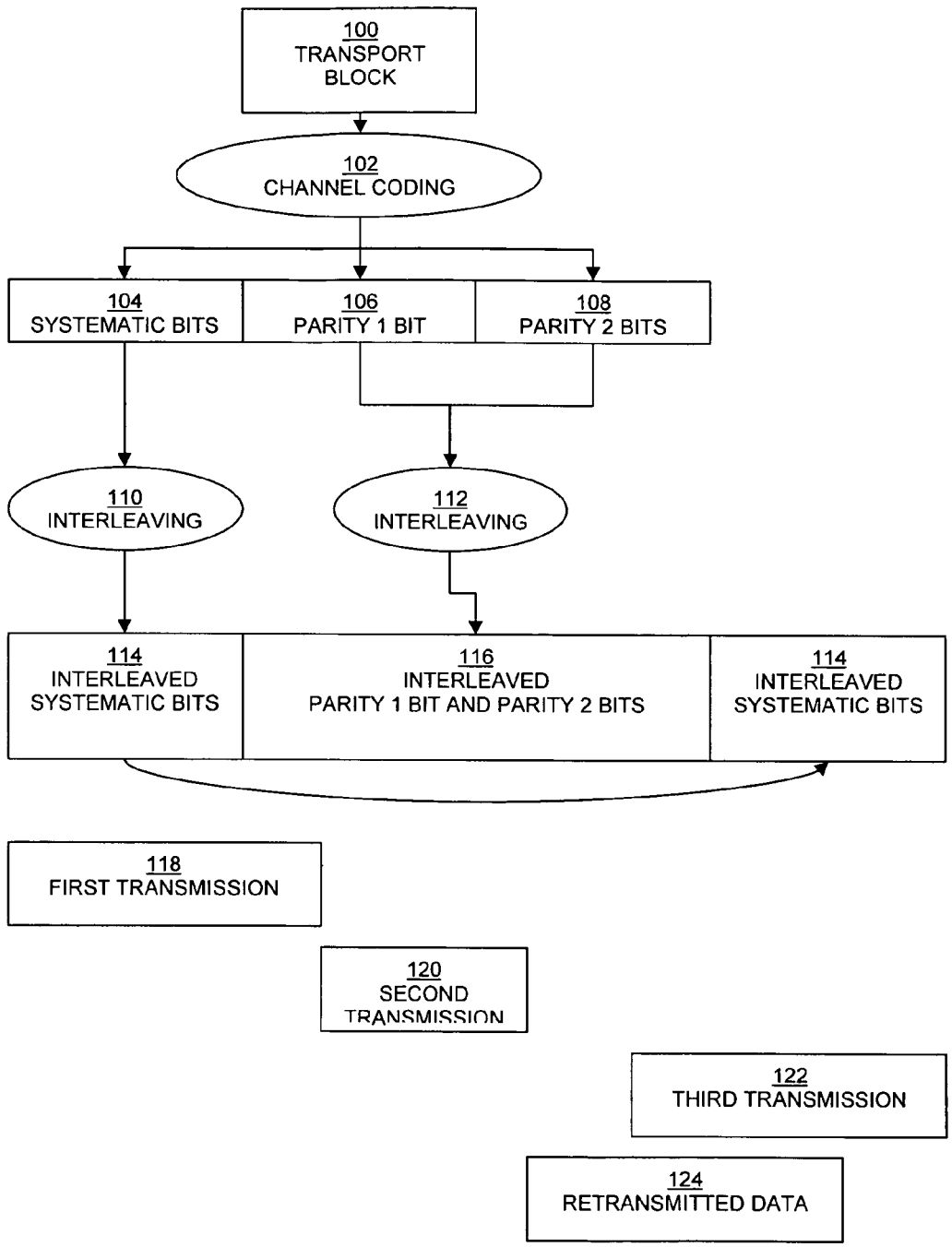
FIG. 2 illustrates a conventional circular buffer method utilized with H-ARQ using variable size resource allocation for H-ARQ retransmissions.
Figure 4:
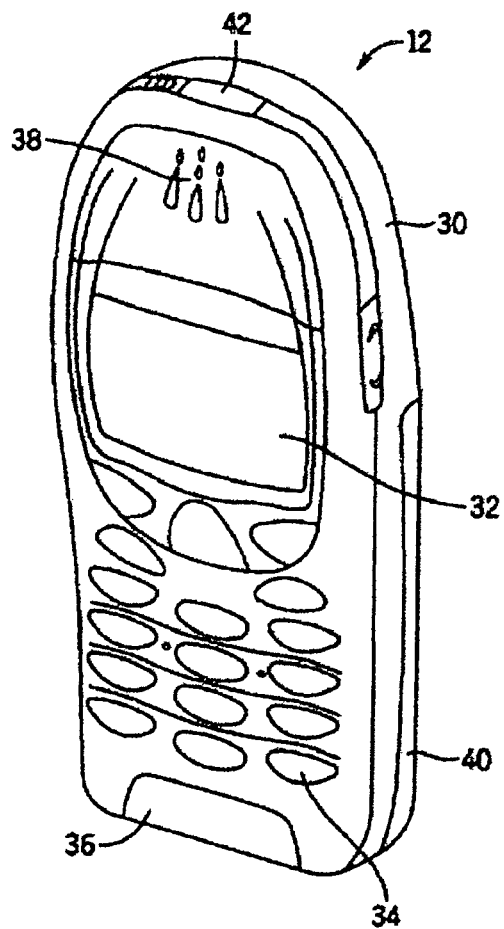
FIG. 4 is a perspective view of a mobile telephone that can be used in the implementation of the present invention.
Figure 5:
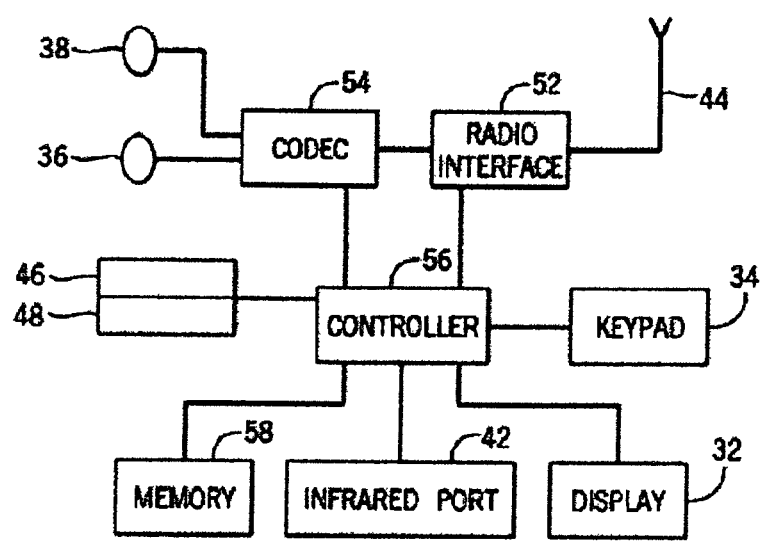
FIG. 5 is a schematic representation of the telephone circuitry of the mobile telephone of FIG. 2.

FIGS. 4 and 5 show one representative mobile device 12 within which the present invention may be implemented. It should be understood, however, that the present invention is not intended to be limited to one particular type of electronic device. The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of signaling, comprising:
   receiving control channel data;
   determining whether the control channel data is at least one of: a retransmission, new data and a first transmission; and
   dynamically interpreting the control channel data based on the determination,
   wherein the control channel data includes a transport block size field,
   wherein the transport block size field is interpreted as indicative of a transport block size in response to determining that the control channel data is at least one of: new data and a first transmission, and
   wherein the transport block size field is interpreted as indicative of a redundancy version in response to determining that the control channel data is a retransmission.

2. The method of claim 1, wherein the new data is indicated with a first value of a new data indicator and the retransmission is indicated with a second value of the new data indicator.

3. The method of claim 1, wherein the redundancy version comprises a circular buffer offset.

4. The method of claim 1, wherein the control channel data is transmitted on a layer1/layer2 control channel.

5. The method of claim 4, wherein the layer1/layer 2 control channel is a downlink shared control channel.

6. The method of claim 4, wherein the layer1/layer 2 control channel is a physical downlink control channel.

7. The method of claim 1, wherein the control channel data is defined by an interpretation table also comprising at least one of a physical resource block map, a modulation technique, multiple input multiple output precoding information, a hybrid automatic repeat request process identification, a user equipment identification and cyclical redundancy check information, and additional information.

8. The method of claim 1, wherein the control channel data is received and decoded by a user equipment of a mobile communication system.

9. The method of claim 8, wherein a base transceiver station of the mobile communication system becomes aware that the user equipment has correctly decoded the control channel data upon receipt of a negative acknowledgement from the user equipment.

10. The method of claim 1, wherein the retransmission comprises a hybrid automatic repeat request retransmission.

11. The method of claim 10, wherein the hybrid automatic repeat request retransmission is associated with at least one of constant size resource allocation and variable size resource allocation.

12. The method of claim 1, wherein the new data is representative of at least one of a plurality of systematic bits and a plurality of parity bits, each resulting from at least one of channel coding and interleaving of a transport block.

13. The method of claim 1, wherein the retransmission is representative of at least one of a plurality of systematic bits and a plurality of parity bits, each resulting from at least one of channel coding and interleaving of a transport block.

14. The method of claim 1, wherein the transport block size field is further interpreted as indicative of a user data payload size in response to determining that the control channel data is the new data.

15. The method of claim 1, wherein the redundancy version is indicative of a starting point of the retransmission in a circular buffer rate matching process.

16. The method of claim 1, wherein the control channel data is received by a base transceiver station of a mobile communications system from a user equipment of the mobile communications system.

17. A computer program product, embodied on a non-transitory computer-readable medium, comprising computer code configured to perform the processes of claim 1.

18. An apparatus, comprising:
a processor; and
a memory unit communicatively connected to the processor and including:
computer code configured to receive control channel data;
computer code configured to determine whether the control channel data is at least one of: a retransmission, new data and a first transmission; and
computer code configured to dynamically interpret the control channel data based on the determination,
wherein the control channel data includes a transport block size field, wherein the transport block size field is interpreted as indicative of a transport block size in response to determining that the control channel data is at least one of: new data and a first transmission, and
wherein the transport block size field is interpreted as indicative of a redundancy version in response to determining that the control channel data is a retransmission.

19. The apparatus of claim 18, wherein the new data is indicated with a first value of a new data indicator and the retransmission is indicated with a second value of the new data indicator.

20. The apparatus of claim 18, wherein the redundancy version comprises a circular buffer offset.

21. The apparatus of claim 18, wherein the control channel data is transmitted on a layer1/layer2 control channel.

22. The apparatus of claim 21, wherein the layer1/layer 2 control channel is a downlink shared control channel.

23. The apparatus of claim 21, wherein the layer1/layer 2 control channel is a physical downlink control channel.

24. The apparatus of claim 18, wherein the control channel data is received and decoded by a user equipment of a mobile communication system.

25. The apparatus of claim 24, wherein a base transceiver station of the mobile communication system becomes aware that the user equipment has correctly decoded the control channel data upon receipt of a negative acknowledgement from the user equipment.

26. The apparatus of claim 18, wherein the retransmission comprises a hybrid automatic repeat request retransmission.

27. The apparatus of claim 26, wherein the hybrid automatic repeat request retransmission is associated with at least one of constant size resource allocation and variable size resource allocation.

28. The apparatus of claim 18, wherein the new data is representative of at least one of a plurality of systematic bits and a plurality of parity bits, each resulting from at least one of channel coding and interleaving of a transport block.

29. The apparatus of claim 18, wherein the retransmission is representative of at least one of a plurality of systematic bits and a plurality of parity bits, each resulting from at least one of channel coding and interleaving of a transport block.

30. The apparatus of claim 18, wherein the transport block size field is further interpreted as indicative of a user data payload size in response to determining that the control channel data is the new data.

31. The apparatus of claim 18, wherein the redundancy version is indicative of a starting point of the retransmission in a circular buffer rate matching process.

32. The apparatus of claim 18, wherein the control channel data is received by a base transceiver station of a mobile communications system from a user equipment of the mobile communications system.

33. A system, comprising:
a transmitter configured to encode a signal and transmit the signal; and
a receiver configured to receive the signal, to determine whether the signal is at least one of: a retransmission, new data and a first transmission and to decode the signal, wherein the decoding of the signal is performed at least by dynamically interpreting control channel data based on the determination,
wherein the control data includes a transport block size field,
wherein the transport block size field is interpreted as indicative of a transport block size in response to determining that the signal is at least one of new data and a first transmission, and
wherein the transport block size field is interpreted as indicative of a redundancy version in response to determining that the signal is a retransmission.

34. The system of claim 33, wherein the new data is indicated with a first value of a new data indicator and the retransmission is indicated with a second value of the new data indicator.

35. The system of claim 33, wherein the redundancy version comprises a circular buffer offset.

36. The system of claim 33, wherein the control channel data is transmitted on a layer1/layer2 control channel.

37. The system of claim 36, wherein the layer1/layer 2 control channel is a downlink shared control channel.

38. The system of claim 36, wherein the layer1/layer 2 control channel is a physical downlink control channel.

39. A method, comprising:
encoding a data signal; and
transmitting control channel data associated with the encoded data signal, the control channel data being configured to be dynamically interpreted,
wherein the control data includes a transport block size field,
wherein the transport block size field is indicative of a transport block size when transmitting at least one of: new data and a first transmission, and
wherein the transport block size field is indicative of a redundancy version when transmitting a retransmission.

40. The method of claim 39, wherein the new data is indicated with a first value of a new data indicator and the retransmission is indicated with a second value of the new data indicator.

41. The method of claim 39, wherein the redundancy version comprises a circular buffer offset.

42. The method of claim 39, wherein the control channel data is transmitted on a layer1/layer2 control channel.

43. The method of claim 42, wherein the layer1/layer 2 control channel is a downlink shared control channel.

44. The method of claim 42, wherein the layer1/layer 2 control channel is a physical downlink control channel.

45. The method of claim 39, wherein the control channel data is defined by an interpretation table also comprising at least one of a physical resource block map, a modulation technique, multiple input multiple output precoding information, a hybrid automatic repeat request process identification, a user equipment identification and cyclical redundancy check information, and additional information.

46. The method of claim 39, wherein the control channel data is received and decoded by a user equipment of a mobile communication system.

47. The method of claim 46, wherein a base transceiver station of the mobile communication system becomes aware that the user equipment has correctly decoded the control channel data upon receipt of a negative acknowledgement from the user equipment.

48. The method of claim 39, wherein the retransmission comprises a hybrid automatic repeat request retransmission.

49. The method of claim 48, wherein the hybrid automatic repeat request retransmission is associated with at least one of constant size resource allocation and variable size resource allocation.

50. The method of claim 39, wherein the new data is representative of at least one of a plurality of systematic bits and a plurality of parity bits, each resulting from at least one of channel coding and interleaving of a transport block.

51. The method of claim 39, wherein the retransmission is representative of at least one of a plurality of systematic bits and a plurality of parity bits, each resulting from at least one of channel coding and interleaving of a transport block.

52. The method of claim 39, wherein the transport block size field is further indicative of a user data payload size when transmitting the new data.

53. The method of claim 39, wherein the redundancy version is indicative of a starting point of the retransmission in a circular buffer rate matching process.

54. The method of claim 39, wherein the control channel data is received by a base transceiver station of a mobile communications system from a user equipment of the mobile communications system.

55. A computer program product, embodied on a non-transitory computer-readable medium, comprising computer code configured to perform the processes of claim 39.

56. A apparatus, comprising:
a processor; and
a memory unit communicatively connected to the processor and including:
computer code configured to encode a data signal; and
computer code configured to transmit control channel data associated with the encoded data signal, the control channel data being configured to be dynamically interpreted,
wherein the control data includes a transport block size field,
wherein the transport block size field is indicative of a transport block size when transmitting at least one of: new data and a first transmission, and
wherein the transport block size field is indicative of a redundancy version when transmitting a retransmission.

57. The apparatus of claim 56, wherein the new data is indicated with a first value of a new data indicator and the retransmission is indicated with a second value of the new data indicator.

58. The apparatus of claim 56, wherein the redundancy version comprises a circular buffer offset.

59. The apparatus of claim 56, wherein the control channel data is transmitted on a layer1/layer2 control channel.

60. The apparatus of claim 59, wherein the layer1/layer 2 control channel is a downlink shared control channel.

61. The apparatus of claim 59, wherein the layer1/layer 2 control channel is a physical downlink control channel.

62. The apparatus of claim 56, wherein the control channel data is received and decoded by a user equipment of a mobile communication system.

63. The apparatus of claim 62, wherein a base transceiver station of the mobile communication system becomes aware that the user equipment has correctly decoded the control channel data upon receipt of a negative acknowledgement from the user equipment.

64. The apparatus of claim 56, wherein the retransmission comprises a hybrid automatic repeat request retransmission.

65. The apparatus of claim 64, wherein the hybrid automatic repeat request retransmission is associated with at least one of constant size resource allocation and variable size resource allocation.

66. The apparatus of claim 56, wherein the new data is representative of at least one of a plurality of systematic bits and a plurality of parity bits, each resulting from at least one of channel coding and interleaving of a transport block.

67. The apparatus of claim 56, wherein the retransmission is representative of at least one of a plurality of systematic bits and a plurality of parity bits, each resulting from at least one of channel coding and interleaving of a transport block.

68. The apparatus of claim 56, wherein the transport block size field is further indicative of a user data payload size when transmitting the new data.

69. The apparatus of claim 56, wherein the redundancy version is indicative of a starting point of the retransmission in a circular buffer rate matching process.

70. The apparatus of claim 56, wherein the control channel data is received by a base transceiver station of a mobile communications system from a user equipment of the mobile communications system.

* * * * *